United States Patent [19]

Bernatt et al.

[11] 4,192,534

[45] Mar. 11, 1980

[54] HIGH VOLTAGE FUSE HAVING ATTACHED TUBULAR MEMBERS

[75] Inventors: Joseph Bernatt, Arlington Heights; Alfred Steegmueller, Skokie, both of Ill.

[73] Assignee: S & C Electric Company, Chicago, Ill.

[21] Appl. No.: 866,929

[22] Filed: Jan. 4, 1978

Related U.S. Application Data

[62] Division of Ser. No. 741,026, Nov. 11, 1976, Pat. No. 4,075,755.

[51] Int. Cl.[2] .............................................. F16L 13/14

[52] U.S. Cl. .............................. 285/382.2; 285/382.5; 29/523

[58] Field of Search .................. 29/523, 623; 337/201, 337/186, 205, 248; 339/217 R, 220 R, 220 T; 285/382.4, 382.5, 382.2

[56] References Cited

U.S. PATENT DOCUMENTS

| | | | |
|---|---|---|---|
| 2,479,702 | 8/1949 | Rood | 29/523 |
| 2,599,646 | 6/1952 | Kozacka | 337/186 |
| 2,868,868 | 1/1959 | Corey | 339/220 R |
| 3,662,309 | 5/1972 | Harmon | 337/248 |
| 3,699,490 | 10/1972 | Macemon | 337/205 |
| 4,069,573 | 1/1978 | Rogers, Jr. et al. | 29/523 |

*Primary Examiner*—Lowell A. Larson
*Attorney, Agent, or Firm*—Kirkland & Ellis

[57] ABSTRACT

Disclosed is novel high-voltage fuse which includes therein attached tubular members. A method of attaching one tubular member such as a hollow metallic conducting tube to another tubular member such as a hollow insulator tube of a high voltage fuse comprises the steps of inserting the metallic tube into the insulator tube to a desired location and then expanding the metallic tube radially outwardly at a position where engagement is desired until the metallic tube engages and at least partially fills an annular groove on the interior of the insulator tube. To further provide a moisture tight seal at the point of engagement, an elastomeric compound such as a room-temperature-vulcanizing silicone rubber may be placed in the groove to assure a moisture tight seal when the metallic tube is expanded. The exterior of the insulator tube is slightly deformed due to expansion of the metallic tube, and the quality of the connection between the tubes may be determined by the amount of this slight deformation.

5 Claims, 6 Drawing Figures

HIGH VOLTAGE FUSE HAVING ATTACHED TUBULAR MEMBERS

This application is a division of Application Ser. No. 741,026, filed Nov. 11, 1976, now U.S. Pat. No. 4,075,755, issued Feb. 28, 1978.

BACKGROUND OF THE INVENTION

1. Field of the Invention

The present invention relates to high-voltage fuses which include attached tubular members, the attachment between the members being effected by a novel method.

2. Description of the Prior Art

High voltage fuses are well known in the art as exemplified by U.S. Pat. Nos. 3,267,232—Barta and 3,176,100—Barta. Certain types of high voltage fuses of the dropout expulsion type have a hollow insulator tube fabricated from an appropriate insulating material such as phenolic or glass fiber-epoxy resin and an upper metal conducting tube mounted within one end of the insulator tube. Heretofore, in such prior art fuses, a collar threaded on to the insulator tube or internal threads within the insulator tubes have been utilized to connect the conducting tube with the insulator tube. Typically, these threads were coated with an adhesive to provide a moisture tight seal.

It has been discovered that a novel fuse having a better connection between the insulator tube and the metallic tube may be accomplished by expanding the metallic tube until the metallic tube engages an annular groove on the interior of the insulator tube. This method provides a strong connection in an economical manner.

BRIEF DESCRIPTION OF THE INVENTION

A novel fuse is produced by a novel method of attaching a hollow metallic tube to a second tubular member of the fuse or other high voltage circuit interrupter in accordance with the present invention. The novel method comprises the steps of inserting the metallic tube into the second tubular member to a desired location, and expanding the metallic tube at a position where connection is desired until the metallic tube engages a groove on the interior of the second tubular member. To provide a moisture tight seal at the point of connection, an elastomeric compound such as a room-temperature-vulcanizing silicone rubber may be applied to the groove before the metallic tube is expanded.

The step of expanding the metallic tube may be accomplished by inserting a resilient member into the metallic tube at the position where connection is desired and then compressing the resilient member to cause the resilient member to expand against the metallic tube so that the metallic tube is expanded to engage the groove. Expansion of the metallic tube may also be accomplished by magnetic pulse forming and by rolling with an expanding roller mandrel.

To determine the quality of the connection between the second tubular member and the metallic tube, the deformation of the second tubular member at the point where the metallic tube is expanded into the groove may be measured to determine whether the metallic tube has been properly expanded.

Thus, it is a primary object of the present invention to provide a novel high voltage fuse and a novel method of attaching a hollow metallic conducting tube to a hollow insulator tube in the high voltage fuse which provides a strong, moisture-impervious connection.

Yet another object of the present invention is to provide a high voltage fuse and a method of attaching a hollow metallic conducting tube to a hollow insulator tube in the high voltage fuse that permits an objective means of determining the quality of the connection.

These and other objects, advantages, and features of the present invention shall hereinafter appear, and for the purposes of illustration, but not for limitation, an exemplary embodiment of the present invention is illustrated in the accompanying drawings. The above referred to novel method is disclosed and claimed in commonly-assigned U.S. Pat. No. 4,075,755, of which this application is a division.

DETAILED DESCRIPTION OF THE PREFERRED EMBODIMENT

Figure 1:
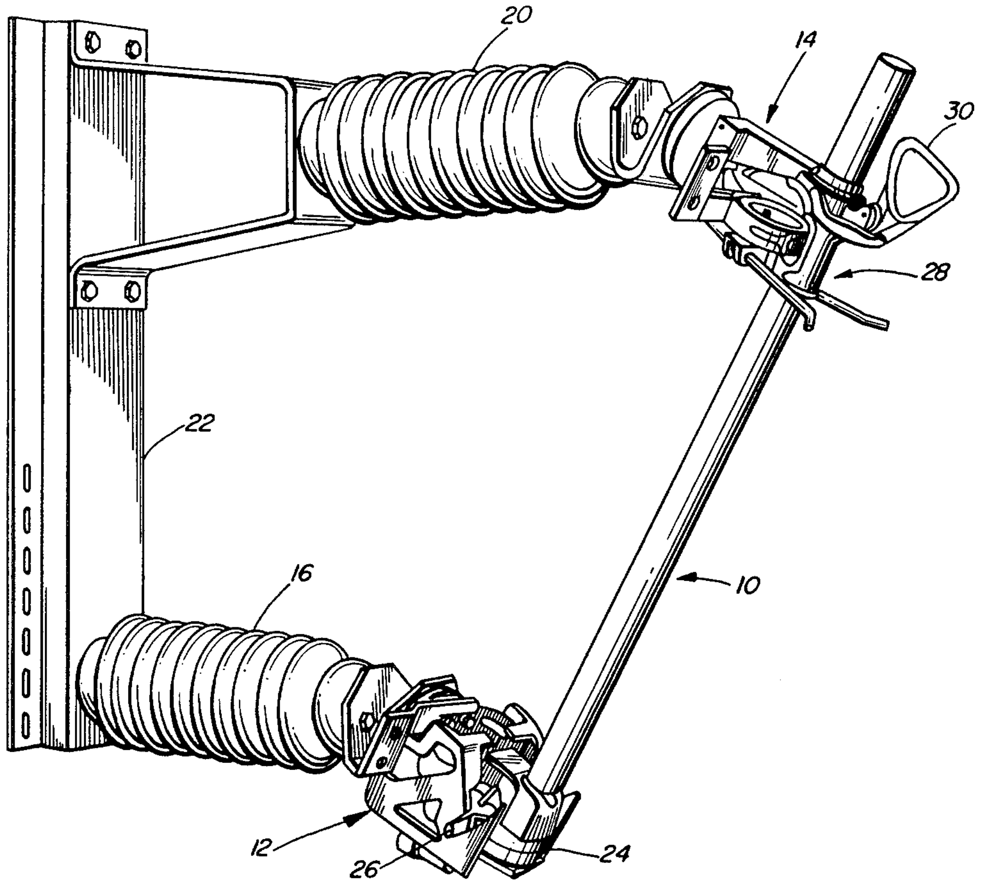
FIG. 1 is a perspective view of a high voltage fuse of the present invention produced by the method thereof.

With reference to FIG. 1, an expulsion fuse 10 of the dropout type is shown mounted between a lower mounting terminal 12 and an upper mounting terminal 14. Terminals 12 and 14 are respectively supported by insulators 16 and 20 which are mounted on a supporting structure 22. Mounted on one end of fuse 10 is a trunnion assembly 24 which has a pin 26 which pivotably rides in a groove in lower mounting terminal 12. Mounted to the other end of fuse 10 is a fuse release assembly 28 which by the pivoting of hook ring 30 permits fuse release assembly 28 to be disengaged from upper mounting terminal 14 so that fuse 10 can be pivoted on pin 26 to disconnect the fuse from the circuit and remove the fuse if necessary. Such mounting arrangements are well known in the art.

Figure 2:
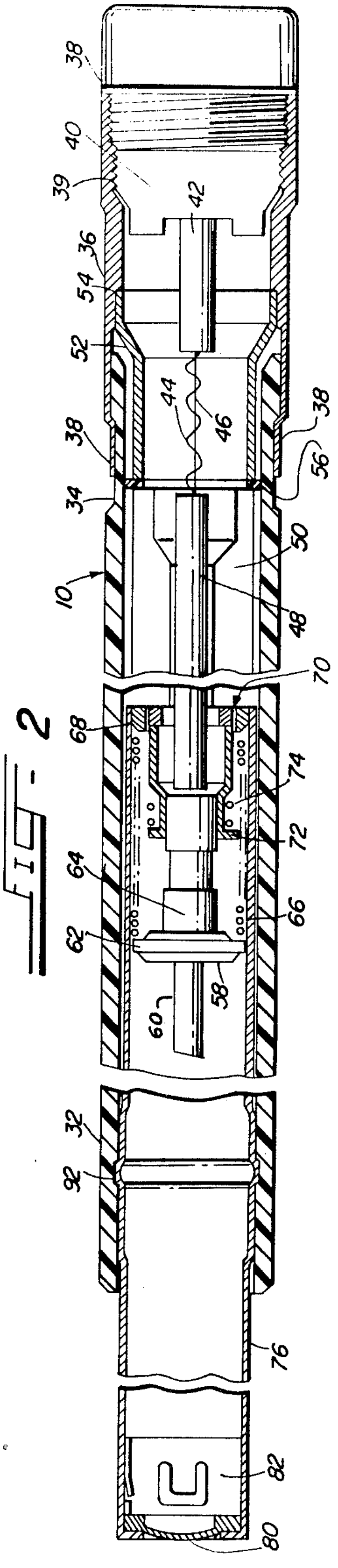
FIG. 2 is a cross-sectional, partially fragmentary view of the fuse illustrated in FIG. 1 showing the connection between the insulator tube and the metallic tube.

With reference to FIG. 2, trunnion assembly 24 and fuse assembly 28 can be removed from fuse 10 so that fuse 10 appears as illustrated in FIG. 2. Fuse 10 comprises a hollow insulator tube 32 that can be fabricated from a conventional organic insulator material such as fiberglass, phenolic, or epoxy resin. Insulator tube 32 has an exterior annular groove 34 adjacent one end thereof, and a metallic exhaust ferrule 36 is attached to that end of insulator tube 32 compressing the end 38 of ferrule 36 into groove 34. Threaded into the end of ferrule 36 and covering the end thereof is a rain cap assembly 38. Rain cap assembly 38 does not form a part of the present invention and may take the form of the breather assembly disclosed in co-pending patent application Ser. No. 741,023, filed Nov. 11, 1976 and assigned to the same assignee as the present invention.

Mounted within the hollow interior of ferrule 36 by threads 39 is a contact bridge 40. Extending from contact bridge 40 is a column shaped element 42 which has attached to the end thereof a fusible element 44 which may be fabricated from silver alloy and a strain wire 46 which may be fabricated from nickle-chrome alloy. Fusible element 44 and strain wire 46 are connected at their opposite end to an arcing rod 48 which extends through a hollow opening through a stack of cakes of arc extinguishing material 50. An exhaust tube 52 is mounted within the insulator tube 32 and retained between a flange 54 on the interior of ferrule 36 and an annular seal 56 positioned between the end of exhaust tube 52 and the arc extinguishing material 50.

Mounted on the other end of arcing rod 48 is a contact button assembly 58 which includes a striker pin 60 extending from a button flange 62 mounted on a contact portion 64. A spring 66 engages the edge of button flange 62 and is compressed between button flange 62 and a flange 68 on a contact assembly 70 mounted in the end of a metallic conducting tube 76. Contact assembly 70 has a plurality of contact fingers 72 which are biased towards contact portion 64 by one or more garter springs 74 which surround contact fingers 72 and bias them inwardly. Metallic tube 76 extends through the interior of insulator tube 32 and extends from the end thereof.

Mounted in the other end of metallic conducting tube 76 and sealing the end thereof is a sealing arrangement 80 which does not form a part of the present invention and may take the form of a sealing arrangement disclosed in co-pending application Ser. No. 741,015, filed Nov. 11, 1976 now U.S. Pat. No. 4,103,270, and assigned to the same assignee as the present invention. Also positioned in the end of metallic tube 76 is a rod catcher arrangement 82 which does not form a part of the present invention and may take the form of the catcher arrangement disclosed in co-pending patent application Ser. No. 741,027, filed Nov. 11, 1976, assigned to the same assignee as the present invention.

Figure 4:
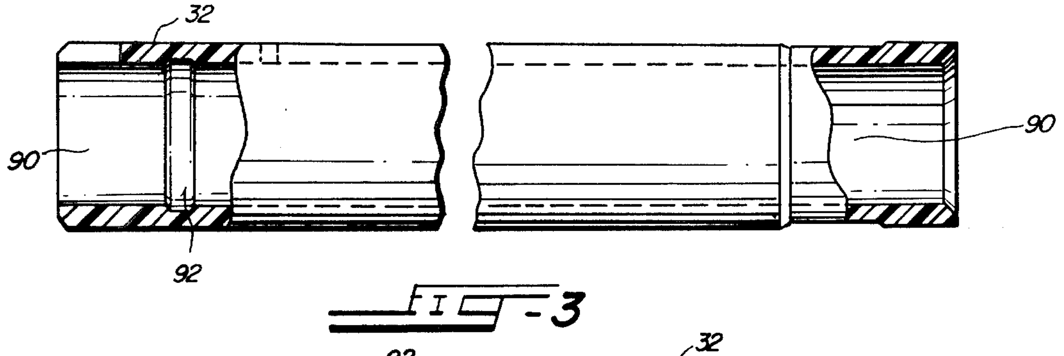
FIG. 4 is a partially cross-sectional, partially fragmentary view of the insulator tube.

With reference to FIG. 4, insulator tube 32 is cylindrically shaped and has a hollow circular interior 90. Formed on the interior surface of insulator tube 32 adjacent one end thereof is an annular groove 92.

Figure 3:
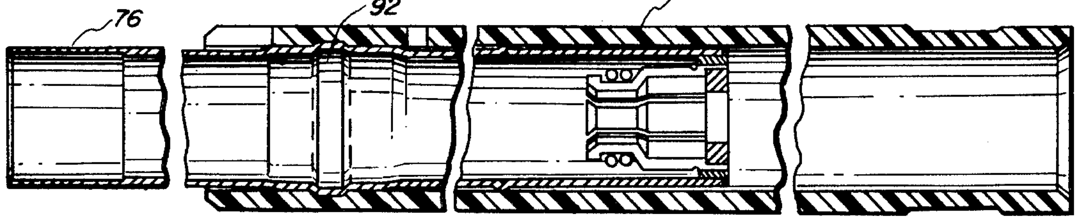
FIG. 3 is a cross-sectional view of the insulator tube and metallic tube.

With reference to FIGS. 2 and 3, it can be seen that metallic tube 76 is attached to insulator tube 32 by a portion of the metallic tube 76 being expanded into groove 92. With reference to FIG. 3, tube 76 is normally dimensioned to slidably fit within insulator tube 32. To attach metallic tube to insulator tube 32, the metallic tube is first inserted into the insulator tube until the metallic tube is in the desired position. The metallic tube is then expanded until it engages the annular groove 92 on the interior of insulator tube 32.

Figure 6:
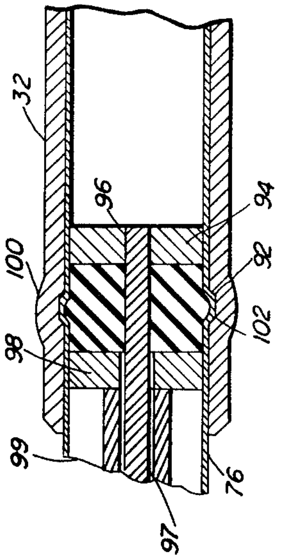
FIG. 6 is a cross-sectional, partially fragmentary view of the insulator tube and metallic tube showing the resilient member of FIG. 5 under compression.
Figure 5:
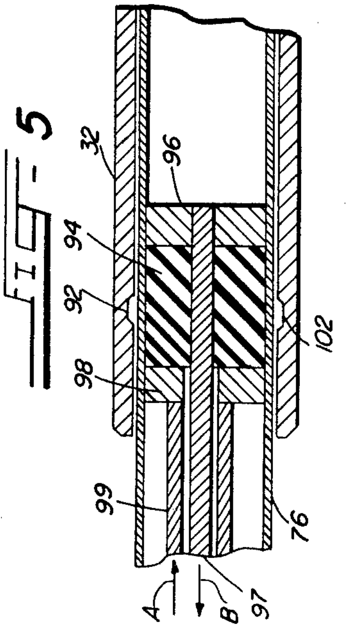
FIG. 5 is a cross-sectional, partially fragmentary view of the insulator tube and metallic tube showing the position before compression of a resilient member used to practice the method of the present invention to produce the fuse shown in FIGS. 1 and 2.

FIGS. 5 and 6 demonstrate one means of expanding tube 76. A resilient member 94 which may be formed of rubber or any other appropriate resilient material is inserted into metallic tube 76 until it is correctly positioned adjacent groove 92. Resilient member 94 is then compressed such as by pistons 96 and 98 until resilient member 94 expands to cause the metallic tube 76 to expand until it engages groove 92. Pistons 96 and 98 are caused to compress resilient member by exerting force in the direction of arrow A on hollow sleeve 99 and force in the direction of arrow B on rod 97 as shown in FIG. 6. This arrangement allows the resilient member 94 to be inserted from the open end of tube 76 and compressed from that end.

As illustrated in FIG. 6, when resilient member 94 is expanded, it also causes the insulator tube 32 to be expanded slightly at the point designated 100 in FIG. 6 (the expansion is exaggerated in FIG. 6 so that it can be better illustrated). After ceasing compression of resilient member 94, insulator tube 32 will continue to be deformed very slightly at point 100 because the metallic member 76 has been expanded in the groove 92. One method of determining whether or not sufficient compression has been applied to assure a proper quality connection between metallic member 76 and insulator tube 32 is to measure the amount of deformation at point 100 remaining after compression has ceased. If properly compressed, tube 32 will continue to remain slightly deformed at point 100 by a measurable predetermined amount which will indicate the quality of the connection between the metallic tube 76 and the insulator tube 72. The permanent deformation will indicate the presence of residual compressive force between the metallic tube 76 and the insulator tube 32.

In addition, before metallic tube 76 is expanded, groove 92 can be coated or filled with an elastomeric compound 102 such as a room-temperature-vulcanizing silicone rubber which after compression forms a water impervious seal between the insulator tube 32 and metallic tube 76.

Metallic tube 76 may be expanded to engage groove 92 in insulator tube 32 by techniques other than the expansion of resilient member 92 as illustrated in FIGS. 5 and 6. Metallic tube 76 may also be expanded by a cold rolling operation utilizing an expanding mandrel or by electromagnetic pulse forming.

It should be expressly understood that the fuse and the method and techniques of connecting a metallic conducting tube to an insulator tube described and illustrated herein are not limited to a fuse exactly of the type illustrated in the drawings. The method described herein may be used in a variety of different types of fuses and electrical components including various other types of high voltage circuit interrupters.

We claim:

1. An improved circuit interrupter of the type which includes a metal tube partially inserted into and extending from an insulator tube, wherein the improvement comprises:

a groove formed in the interior surface of the insulator tube generally perpendicular to the major axis thereof;

a metal tube portion expanded outwardly, radially of both tubes into the groove; and a slightly expanded area on the exterior of the insulator tube caused by the expansion of the metal tube portion into the groove, whereby the tubes are attached.

2. The circuit interrupter of claim 1 wherein the tubes are generally cylindrical and wherein the groove, the expanded portion, and the slightly expanded area have generally annular configurations.

3. The circuit interrupter of claim 2 wherein the slightly expanded area is indicative of the quality of the attachment between the tubes.

4. The circuit interrupter of claim 2 which further comprises:

an elastomer in the groove which provides a moisture-tight seal between the tubes.

5. An improved circuit interrupter of the type which includes a metal tube partially inserted into and extending from an insulator tube, wherein the improvement comprises:

a groove formed in the interior surface of the insulator tube;

a metal tube portion expanded outwardly, radially of both tubes into the groove; and a permanent slightly expanded area on the exterior of the insulator tube caused by the expansion of the metal tube portion into the groove;

whereby the tubes are attached.

* * * * *